United States Patent
Trautenberg

(10) Patent No.: US 8,094,068 B2
(45) Date of Patent: Jan. 10, 2012

(54) PROCESS FOR IMPROVING THE CONTINUITY IN THE CASE OF A TWO-FREQUENCY NAVIGATION SATELLITE SYSTEM

(75) Inventor: Hans L. Trautenberg, Ottobrunn (DE)

(73) Assignee: Astrium GmbH, Taufkrichen (DE)

( * ) Notice: Subject to any disclaimer, the term of this patent is extended or adjusted under 35 U.S.C. 154(b) by 208 days.

(21) Appl. No.: 12/470,230

(22) Filed: May 21, 2009

(65) Prior Publication Data

US 2009/0289842 A1 Nov. 26, 2009

(30) Foreign Application Priority Data

May 26, 2008 (DE) .......................... 10 2008 025 064

(51) Int. Cl.
*G01S 19/20* (2010.01)
*G01S 19/08* (2010.01)
(52) U.S. Cl. .............................. 342/357.58; 342/357.45
(58) Field of Classification Search ............. 342/357.58, 342/357.45, 357.44, 357, 395
See application file for complete search history.

(56) References Cited

U.S. PATENT DOCUMENTS

| 6,667,713 | B2 * | 12/2003 | Green et al. | 342/357.31 |
| 7,095,369 | B1 * | 8/2006 | Clark | 342/357.58 |
| 7,502,689 | B2 * | 3/2009 | Jakowski et al. | 702/2 |
| 2006/0214844 | A1 * | 9/2006 | Fagan et al. | 342/357.02 |

FOREIGN PATENT DOCUMENTS

EP 1 862 809 A1 12/2007

OTHER PUBLICATIONS

Skone, "Ionospheric Warning System for Marine DGPS Users" Proceedings of ION GNSS 2006, Sep. 2006, pp. 1992-2005.*
Oehler et al , "The Galileo Integirty Concept and Performance," Proceedings of the GNSS—2005, The Euorpean Navigation Conerence, Jul. 19-22, 2005, pp. 1-11.*
S. Skone, "Ionospheric Warning System for Marine DGPS Users", ION GNSS 19th International Technical Meeting of the Satellite Division, Sep. 26-29, 2006, Fort Worth, TX, XP-002560830, pp. 1992-2005.
J. R. Martin, "Galileo Orbitography and Synchronization Processing Facility (OSPF): Preliminary Design", ION GNSS 19th International Technical Meeting of the Satellite Division, Sep. 26-29, 2006, Fort Worth, TX, XP002560831, pp. 575-583.
European Search Report dated Jan. 4, 2010 w/partial English translation (eight (8) pages).
Helmut Blomenhofer et al., "GNSS/Galileo Global and Regional Integrity Performance Analysis", Thales ATM GmbH, NavPos Systems GmbH, 1-11 pgs., 2004.

* cited by examiner

*Primary Examiner* — Gregory C Issing
(74) *Attorney, Agent, or Firm* — Crowell & Moring LLP

(57) ABSTRACT

A process for improving continuity in a two-frequency navigation satellite system includes steps of i) observing the ionosphere by measurements in the two or more frequency bands; and ii) transmitting an alert message which informs user systems of a change of the ionosphere when at least one measurement indicates a change of the ionosphere that deviates from one or more predefined conditions.

15 Claims, 2 Drawing Sheets

PROCESS FOR IMPROVING THE CONTINUITY IN THE CASE OF A TWO-FREQUENCY NAVIGATION SATELLITE SYSTEM

BACKGROUND AND SUMMARY OF THE INVENTION

This application claims the priority of German patent document 10 2008 025 064.3-55, filed May 26, 2008, the disclosure of which is expressly incorporated by reference herein.

The present invention relates to a process for improving continuity in a two-frequency navigation satellite system.

Global Navigation Satellite Systems (GNSS), sometimes referred to as Navigation Satellite Systems, are used for position indicating and navigation on the ground and in the air. GNSS Systems, such as the operating GPS (Global Positioning System), or the European Navigation Satellite System (hereinafter, also called Galileo System, or abbreviated Galileo), which is being constructed, have a satellite system (space segment) comprising multiple satellites, an earth-fixed receiving device system (ground segment), which is connected with a central computing station and includes several ground stations, as well as Galileo sensor stations. Utilization systems evaluate and utilize the satellite signals transmitted from the satellites by wireless communication, particularly for navigation. In the GPS, satellite signals are transmitted for civil purposes in the L1 frequency band (that is, with a 1575.42 MHz carrier frequency). As a result, propagation time errors caused by the effects of the ionosphere may directly impair the navigation precision.

In the Galileo System, which is currently under construction, and in the planned modernization of the GPS, it is contemplated that two frequency bands will be used for the transmission of civil satellite signals, in order to better compensate or even eliminate the influence of the ionosphere on the propagation time of the satellite signals. In such a two-frequency navigation satellite system, the same satellite signal is transmitted in two different frequency bands, for example, in the L1 and in the L2 band (1227,60 MHz).

A user system such as a mobile navigation device which receives the signal can compare the two signals and compensate propagation time differences. However, the failure of the transmission of satellite signals in one of the two frequency bands may negatively affect the continuity of the system because a receiving user system can no longer determine the influence of the ionosphere. This can be a disadvantage particularly for the safety-critical service (Safety of Life (SoL) Service) provided by the Galileo System, which requires a continuously high navigation precision.

It is therefore an object of the present invention to provide a process for improving continuity in a two-frequency navigation satellite system.

This and other objects and advantages are achieved by the process and apparatus according to the invention, in which the ionosphere is observed by two-frequency measurements and changes of the ionosphere are signaled. A user system can thereby be warned of particularly strong changes of the ionosphere and a resulting possible interference with the transmission of a satellite system and can react correspondingly, so that the continuity can be improved. In particular, the failure of the transmission of satellite signals on one frequency because of strong changes of the ionosphere no longer leads necessarily to a continuity event because a user system can react sufficiently quickly to a signaled change of the ionosphere, and still complete its operation.

Accordingly, one embodiment of the invention now relates to a process for improving the continuity in the case of a two-frequency navigation satellite system, which process includes the following steps:

Observing the ionosphere by measurements in the two or more frequency bands, and transmitting an alert message which informs user systems of a change of the ionosphere when at least one measurement indicates a change that deviates from one or more predefined conditions. This technique makes it possible to alert a user system, which can adapt its position indication to take into account the change of the ionosphere.

According to a feature of the invention, the observation of the ionosphere by measurements in the two or more frequency bands can take place from a ground segment of the navigation satellite system and/or from satellites of the navigation satellite system. Also, the transmission of the alert message can take place either by way of satellites of the navigation satellite system or from a ground segment of the navigation satellite system.

The measurements can include propagation time measurements of signals transmitted in the frequency bands, so that a change of the ionosphere can be determined relatively rapidly and reliably.

The observation of the ionosphere by measurements in two or more frequency bands may comprise the emission of at least one measuring signal. Instead of conventional signals of the navigation satellite system, which can also be utilized for the observation of the ionosphere, a targeted observation of the ionosphere can also be carried out using separate measuring signals.

According to the invention, one of the predefined conditions may be a minimum duration of a change of the ionosphere. Therefore only a measurement or observation of the ionosphere which indicates a longer (rather than transient or fast) change of the ionosphere can trigger the emission of an alert message because the continuity could be restricted by a longer change.

Another one of the predefined conditions may be an exceeding of a predefined maximum propagation time deviation of a measuring signal. As a result, brief propagation time deviations of a signal from an expected propagation time (which may be caused, for example, by fast ionosphere changes) cannot cause emission of an alert message which could lead to unnecessary reactions in the user systems.

The alert message according to the invention may have one or more of the following pieces of information: Region with respect to which there is a disturbance of the ionosphere; location and extent of an ionospheric disturbance in a layer at a certain altitude; a polygon which indicates the region of an ionospheric disturbance in a layer at a certain altitude; a mere indication of the presence of a disturbance; information on a delay or a reduction of a delay maximal in a time interval, for which continuity is to be ensured.

The invention also relates to a two-frequency navigation satellite system, which comprises a space segment having several satellites which emit satellite signals containing navigation messages for the reception and evaluation by user systems for position indication and navigation by way of two frequencies, and a ground segment having several observation and command stations which monitor the satellites, one or more observation and command stations and/or satellites for implementing the process according to the invention as described above in order to optimize the continuity in the two-frequency navigation satellite system.

Another embodiment of the invention relates to a process for processing an alert message, having the following steps:

Receiving an alert message which was transmitted by means of the process according to the invention as described above;

determining the information concerning a change of the ionosphere contained in the alert message; and computing the influence of the change of the ionosphere on a position indication. This process can be implemented, for example, in the form of an algorithm, in a receiver for satellite signals.

The process according to the invention can be carried out by a receiver for satellite signals of a two-frequency navigation satellite system. If the receiver first receives two measuring signals on two different frequencies and then loses one of the measuring signals, so that only one of the two measuring signals will still be available, it uses a last-determined ionospheric propagation time delay of the particular measuring signal which is no longer available for the position indication. In addition, in this embodiment, the process also includes a step of deciding whether the last-determined ionospheric propagation time delay of the measuring signal can be used to compensate the influence of the change of the ionosphere received by means of the alert message. This makes it possible for a receiver still receiving only one measuring signal on one frequency (because, for example, there is a disturbance of the second frequency provided for the transmission of satellite signals) to decide upon receipt of an alert message whether the ionospheric disturbance signaled by means of the alert message can still be compensated by means of the last-determined propagation time delay, or whether it is so large that compensation using the last-determined propagation time delay no longer makes sense in order to maintain the required continuity.

Furthermore, according to another embodiment of the invention, the process includes a further step of excluding those satellites from the position indication which, as a result of the computed influence of the change of the ionosphere on the position indication, have signal propagation times that are too long.

Finally, the invention also provides a receiver for signals of a navigation satellite system which contain alert messages, wherein the receiver is configured to perform the process for processing an alert message according to the invention and as described above. The process can, for example, be implemented in the operating software of a receiver for navigation messages, such as a mobile navigation device. As a result, the functionality of the receiver can be expanded in that, in the event of a change of the ionosphere signaled by means of an alert message, the receiver initiates measures to maintain the precision of the position indication.

Other objects, advantages and novel features of the present invention will become apparent from the following detailed description of the invention when considered in conjunction with the accompanying drawings.

DETAILED DESCRIPTION OF THE DRAWINGS

Figure 1:
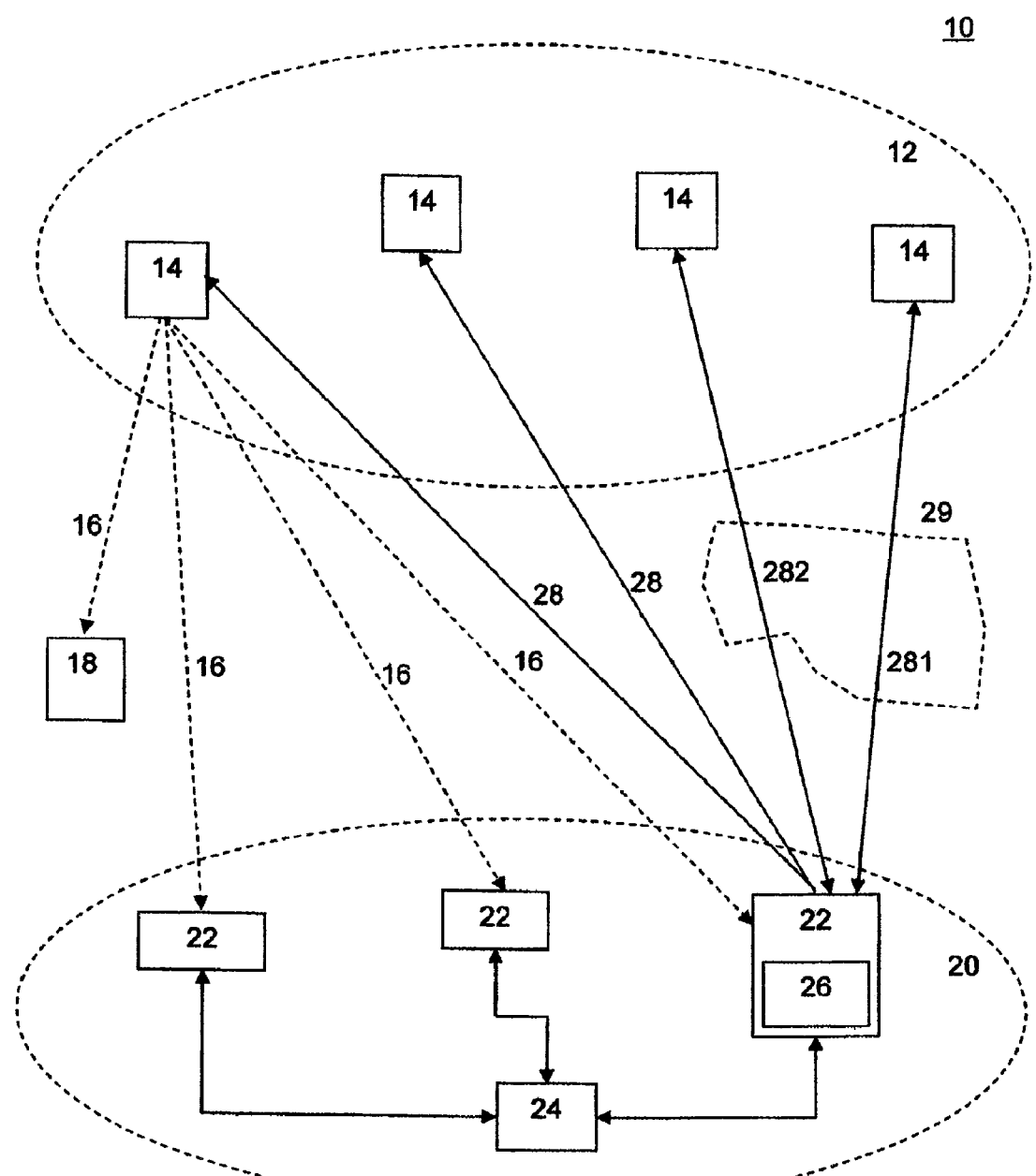
FIG. 1 is a schematic depiction of a navigation satellite system with an embodiment of a system for improving the continuity in the case of a two-frequency navigation satellite system according to the invention.

In the following, identical and/or functionally identical elements can be provided with the same reference symbols. Also, the terms and assigned reference symbols used in the list of reference symbols in the following will be used in the description, in the claims, in the abstract and in the drawings.

FIG. 1 shows a two-frequency navigation satellite system 10 having a space segment 12 and a ground segment 20. The space segment 12 includes several satellites 14, each of which orbits around the ground segment 20. Each satellite emits satellite signals 16 on two frequencies or in two frequency bands, such as the L1 and L2 band, which can be received by user systems 18, such as mobile navigation devices, as well as by observation and command stations 22 of the ground segment 20. The satellite signals 16 contain navigation messages which contain orbital parameters for the description of the orbit. The observation and command stations 22 (which, in the case of the Galileo System, are designed as separate units) are provided particularly for monitoring and controlling the satellites 14. For this purpose, they transmit received navigation signals 16 by way of a communication network to a control center 24 (a central processing point of the ground segment 20) which analyzes the received signals 16. In particular, the control center 24 examines the data of a satellite 14 transmitted with each navigation signal 16, including its orbit and the point in time at which the signal was generated, as well as the signal structure and integrity of the received signals.

Especially for critical services, such as the initially mentioned SoL Service in the case of Galileo, a continuous data stream from the satellite 14 to the user systems 18 is significant because it ensures that the user systems 18 which utilize the SoL Service can determine their position as precisely as possible. An example of a SoL Service is satellite-supported navigation during the approach of an airplane. The continuity of the data stream may be impaired by changes in the ionosphere, even in the case of a two-frequency navigation satellite system, because a user system, particularly in the case of a transmission of satellite signals in a frequency band impaired by an ionospheric disturbance, can no longer compensate influences of the ionosphere on the propagation time of the satellite signals, which may be of essential significance for a precise position indication. In FIG. 1, a region in which there is an ionospheric disturbance has the reference number 29.

In order to observe the ionosphere and its influence on the propagation of satellite signals 16, an observation and command station 22 has measuring devices 26 which generate measuring signals 281 and 282, transmit them to the satellites 14, and determine the influence of the ionosphere on the measuring signals 281 and 282. The latter signals may be special signals or they may be integrated in a conventional signal of the observation and command station 22.

The measuring signals 281 and 282 are transmitted from the observation and command station 22 to different satellites 14. After the receipt, the satellites 14 send the received measuring signals 281 and 282 back to the sending observation and command station 22, so that the latter can, for example, determine propagation time measurements of the signals 281 and 282 to the different individual satellites 14. The satellites 14 can embed their own measuring data in the sent-back measuring signals 281 and 282, which measuring data can then be analyzed by the measuring devices 26 of the observation and command station 22. If a measurement indicates that an ionospheric disturbance 29 is present, an alert message 28 is transmitted to the satellites 14 containing information about the disturbance, which is further signaled from the satellites 14 to the use systems 18 by a satellite signal 16.

As an alternative or in addition, the satellites 14 themselves can also determine, based on the received measuring signals 281 and 282, whether an ionospheric disturbance 29 is present, and can signal the latter directly by an alert message via a satellite signal 16 to the use systems 18 and the ground segment 20. The latter alternative is particularly advantageous for bringing about a rapid signaling of an ionospheric disturbance to the use systems 18. The signaled ionospheric disturbances comprise particularly those changes of the ionosphere which could lead to an impairment of a satellite signal 16 in a frequency band.

Figure 2:
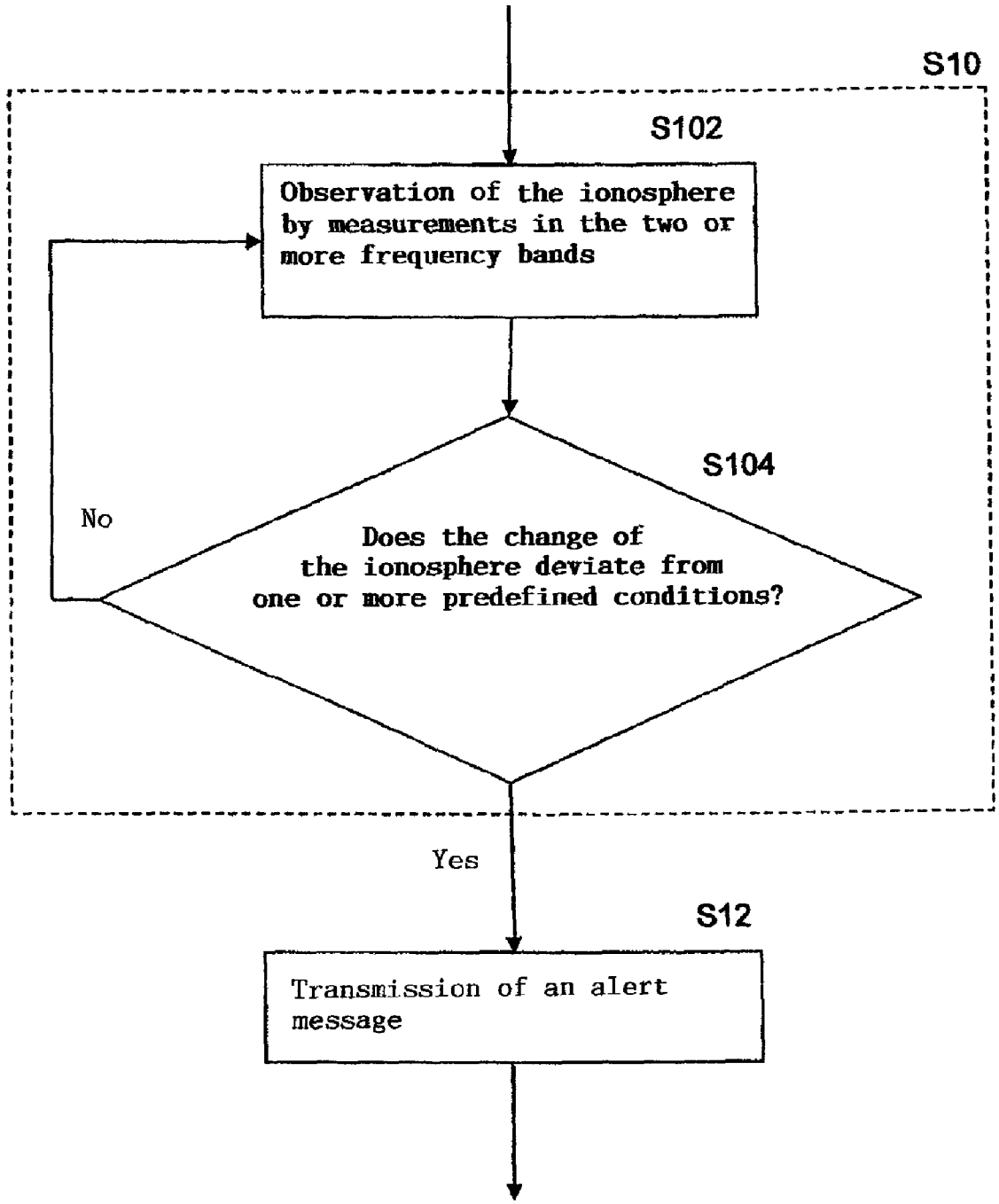
FIG. 2 is a flow chart of an embodiment of the process according to the invention for improving the continuity in a two-frequency navigation satellite system.

FIG. 2 is a flow diagram which shows the basic steps of the process of observation and alerting operation, which may be implemented, for example, in the form of an algorithm in the measuring devices 26 of an observation and command station 22. The observation of the ionosphere (that is, the actual measuring operation) takes place in Step S10, which itself includes two Steps S102 and 104. In Step S102, the ionosphere is observed by measuring signals which are transmitted in the two frequencies or frequency bands utilized by the navigation satellite system, either emitted by an observation and command station 22 or also directly by satellites. Subsequently, a received measuring signal is analyzed in Step S104; that is, changes of the ionosphere signaled by the measuring signal are analyzed to determine whether the change deviates from one or more conditions. For example, if the signal propagation time of a measuring signal exceeds a predefined maximum value, a significant ionospheric disturbance can be assumed. By means of the exact measured signal propagation time, the type and particularly the intensity of the ionospheric disturbance can be further limited.

If it is determined in Step S104 that the measured changes of the ionosphere deviate from one or more of the conditions, the process is continued in Step S12. (Otherwise, another measurement is carried out as per Step S102.) In Step S12, an alert message is transmitted to the satellites or from the satellites 14 to the user systems 18. Of course, the alert message need not be sent when only a rapid change of the ionosphere was observed, which does not significantly impair the continuity.

An alert message may contain the following information concerning the observed change of the ionosphere:

1. The disturbance alert with respect to the ionosphere applies to an entire region which was predefined and fixed in the ICD.

2. The location (in magnetic coordinates) and the extent (as the radius) of the ionospheric disturbance in a layer at a certain altitude (for example, 300 km) are transmitted in the alert message.

3. The location (in magnetic coordinates) and the extent (as a description of an ellipse) of the ionospheric disturbance in a layer at a certain altitude (for example, 300 km) are transmitted in the alert message.

4. A polygon, which describes the region (in magnetic coordinates) of the ionospheric disturbance in a layer at a certain altitude (for example, 300 km), is transmitted in the alert message.

Of course, the alert message may indicate only that a disturbance is present. However, it may also indicate how long the delay was, or how large the reduction of the delay was maximally in the time interval for which the continuity was to be determined.

The following is a summary of an example of the processing of an alert message in a user system: After receiving an alert message, a user system can compute how much the change of the ionosphere signaled by means of the alert message affects its position solution or position indication. Furthermore, by an extrapolation of preceding two-frequency measurements by the user system, it can exclude from the position solution or position indication those satellites for which the propagation time through the ionosphere is no longer sufficiently precise.

By means of the invention, the continuity in the case of a two-frequency navigations satellite system can be significantly improved. On the one hand, it is available for the reduction of errors as a result of the two-frequency measurement or transmission of satellite signals which, as a rule, is better than the ionosphere models of the WAAS (Wide Area Augmentation System) and of the EGNOS (European Geostationary Navigation Overlay Service). On the other hand, the two-frequency navigation satellite system according to the invention can be operated with only slightly raised errors should a frequency or a frequency band fail due to ionospheric disturbances, because a user system is warned of significant changes of the ionosphere which can lead to high errors. As a result, the failure of a frequency will no longer necessarily result in a continuity event because, in the event of a failure of a frequency, a user system can normally still complete its operation before the occurrence of a ionosphere alert message.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SYMBOLS

10 Navigation satellite system
12 Space segment
14 Satellites
16 Satellite signals
18 Use systems
20 Ground segment
22 Observation and command stations
24 Control center
26 Measuring devices for generating and observing the measuring signals 281 and 282
28 Alert message of an observation and command station 22
281, 282 Measuring signal of an observation and command station 22
29 Region with an ionospheric disturbance
S10-S12 Process steps

What is claimed is:

1. A process for improving continuity in a two-frequency navigation satellite system, said process comprising:
    observing the ionosphere by measurements in at least two frequency bands containing the frequencies at which satellites of the two-frequency navigation satellite system transmit satellite navigation signals; and
    transmitting an alert message which informs user systems of a change of the ionosphere when at least one measurement indicates a change of the ionosphere that deviates from at least one predefined conditions; wherein,
    observation of the ionosphere is performed by at least one of a ground segment of the navigation satellite system, and satellites of the navigation satellite system;
    said measurements comprise propagation time measurements of measuring signals transmitted between said ground segment and said satellites, in the at least two frequency bands; and, the measuring signals are distinct from the navigation signals.

2. A process for improving continuity in a two-frequency navigation satellite system, said process comprising:

observing the ionosphere by measurements in at least two frequency bands containing the frequencies at which satellites of the two-frequency navigation satellite system transmit satellite navigation signals; and transmitting an alert message which informs user systems of a change of the ionosphere when at least one measurement indicates a change of the ionosphere that deviates from at least one predefined conditions;

wherein the observation of the ionosphere by measurements in the at least two frequency bands comprises, emission of at least one measuring signal, which is transmitted between a ground segment of said navigation satellite system and satellites of the satellite system and which is distinct from the navigation signals; and measurement of propagation times of said measuring signal for said satellites.

3. The process according to claim 2, wherein the transmission of the alert message is performed by at least one of satellites of the navigation satellite system, and a ground segment of the navigation satellite system.

4. The process according to claim 2, wherein one of the at least one predefined condition is a minimum duration of a change of the ionosphere.

5. The process according to claim 2, wherein one of the at least one predefined condition is an exceeding of a predefined maximum propagation time deviation of a measuring signal.

6. The process according to claim 2, wherein the alert message contains information concerning at least one of a region with respect to which there is a disturbance of the ionosphere, the location and extent of an ionospheric disturbance in a layer at a certain altitude, a polygon which designates a region of an ionospheric disturbance in a layer at a certain altitude, presence of a disturbance, and a delay or a reduction of a delay maximal in a time interval for which continuity is to be ensured.

7. The process according to claim 2, further comprising:
determining information concerning a change of the ionosphere contained in the alert message; and
computing an influence of the change of the ionosphere on a position indication.

8. The process according to claim 7, wherein:
the process is carried out by a receiver for satellite signals of a two-frequency navigation satellite system;
the receiver first receives two measuring signals on two different frequencies and then loses one of the measuring signals, so that only one of the two measuring signals will still be available; and
the receiver uses the ionospheric propagation time delay of the measuring signal last determined from the two-frequency measurement for the position indication; and
the receiver decides whether the last-determined ionospheric propagation time delay of the measuring signal can be used for a compensation of the influence of the ionosphere by means of the change of the ionosphere received in the alert message.

9. The process according to claim 7, further comprising, excluding from the position indication those satellites which, as a result of the computed influence of the change of the ionosphere on the position indication have excessive signal propagation times.

10. The process according to claim 2, wherein:
said measuring signals are generated and transmitted to said satellites by measuring devices included in said ground segment;
said satellites retransmit the received measuring signals back to said ground segment.

11. The process according to claim 10, wherein:
said satellites embed their own measuring data in the retransmitted measuring signals; and
said measuring data devices analyze said measuring data embedded in the retransmitted data to detect a disturbance in the ionosphere.

12. The process according to claim 2, wherein:
said measuring segments are generated, and transmitted to said satellites by measuring devices included in said ground segment; and
said satellites determine, based on said measuring signals, whether a disturbance in the ionosphere is present, and if so, send an alert message directly to user systems and to said ground segment.

13. The process according to claim 12, wherein one of the at least one predefined condition is a minimum duration of a change of the ionosphere.

14. The process according to claim 12, wherein one of the at least one predefined condition is an exceeding of a predefined maximum propagation time deviation of a measuring signal.

15. A two-frequency navigation satellite system, which comprises:
a space segment having several satellites that emit satellite navigation signals in two frequencies, said signals containing navigation messages for reception and evaluation by user systems for position indication and navigation; and
a ground segment that includes a plurality of observation and command stations which monitor the satellites; wherein
at least one of i) the observation and command stations, and ii) the satellites observes the ionosphere by measurements in at least two frequency bands containing the frequencies of the two-frequency navigation satellite system, and transmits an alert message which informs user systems of a change of the ionosphere when at least one measurement indicates a change of the ionosphere that deviates from at least one predefined conditions; and
said measurements in at least two frequency bands are made by,
emission of at least one measuring signal, which is transmitted between a ground segment of said navigation satellite system and satellites of the satellite system and which is distinct from the navigation signals; and
measurement of propagation times of said measuring signal for said satellites.

* * * * *